United States Patent

Nakagawa et al.

[11] 3,980,058
[45] Sept. 14, 1976

[54] FUEL FEED CONTROL SYSTEM OF INTERNAL COMBUSTION ENGINE

[75] Inventors: Ryoichi Nakagawa, Tokyo; Shuya Nambu, Yokosuka; Hidehiro Minami, Yokohama, all of Japan

[73] Assignee: Nissan Motor Co., Ltd., Yokohama, Japan

[22] Filed: Mar. 27, 1974

[21] Appl. No.: 455,274

[30] Foreign Application Priority Data

Mar. 28, 1973 Japan................ 48-35444

[52] U.S. Cl................ 123/32 SP; 123/32 ST; 123/127; 123/75 B; 123/32 AE
[51] Int. Cl.²................ F02B 19/10; F02B 19/18
[58] Field of Search........ 123/32 ST, 32 SP, 32 AE, 123/32 EA, 75 B, 127

[56] References Cited
UNITED STATES PATENTS

| | | | |
|---|---|---|---|
| 2,914,043 | 11/1959 | Nallinger | 123/32 SP |
| 3,102,521 | 9/1963 | Slemmons | 123/32 SP |
| 3,174,470 | 3/1965 | Von Seggern | 123/32 SP |
| 3,463,130 | 8/1969 | Reichardt | 123/32 EA |
| 3,508,530 | 4/1970 | Clawson | 123/32 SP |
| 3,659,564 | 5/1972 | Suzuki | 123/32 SP |

Primary Examiner—Charles J. Myhre
Assistant Examiner—Ronald B. Cox

[57] ABSTRACT

A multi cylinder torch ignition internal combustion engine including a main combustion chamber and an auxiliary combustion chamber for each is cylinder designed for proper air-fuel ratios of mixtures for both types of combustion chambers. In order to effectively prevent uneven distribution of air-fuel mixture in each of the engine cylinders irrespective of complicated configuration of the intake manifold of the engine, an intake valve is provided in each of the main combustion chambers and the auxiliary combustion chambers. The latter communicate with the main combustion chambers and have an ignition plug therein. An independent intake passageway is between each intake valve and the intake manifold, and a fuel injection device is disposed in each of the intake passageways. By this arrangement, a proper air-fuel mixture ratio can be individually maintained in the main combustion chamber and the auxiliary combustion chamber.

7 Claims, 9 Drawing Figures

FUEL FEED CONTROL SYSTEM OF INTERNAL COMBUSTION ENGINE

The present invention relates in general to a fuel feed system of a torch ignition type internal combustion engine provided with a plurality of main combustion chambers and in addition with a plurality of auxiliary combustion chambers each communicating with the corresponding main combustion chamber, and in particular to a fuel feed control system of such engine to maintain proper air-fuel ratios in mixture for the main as well as for the auxiliary combustion chambers.

An internal combustion engine including a main combustion chamber and an auxiliary combustion chamber communicating with the main combustion chamber and having an ignition plug in the auxiliary chamber is known as a torch ignition type engine. Such internal combustion engine has an arrangement for air-fuel mixture feed and ignition that a rich air-fuel mixture is fed into the auxiliary combustion chamber where this mixture is ignited to produce a flame front which bursts out into the main combustion chamber to cause a lean air-fuel mixture in the main combustion chamber to ignite and combust. Ignition and combustion of a lean fuel mixture gas within the main combustion chamber of the engine produces as a whole only little noxious compounds such as HC, CO, and/or $NO_x$ in the exhaust gas, which is an outstanding advantageous feature of this type of internal combustion engine which in turn strengthens the position of this type of engine from the viewpoint of environmental pollution control.

When applying this type of an air-fuel feed and combustion system in practice to a multi cylinder engine provided with a carburetor or carburetors the intake manifold necessarily tends to have a complicated configuration. This inevitably leads to such a drawback that the volumetric distribution of the air-fuel mixture to the cylinders is uneven. In order to overcome this drawback, it has been proposed that a supercharger be provided for improving the air flow through the carburetor or that fuel is injected directly into the combustion chamber, etc.

In the former arrangement, i.e., wherein an air-fuel mixture is fed into the intake manifold, as in the case of a carburetor engine, it is still difficult in practice to provide uniform distribution of the mixture to each of the engine cylinders due to a complicated passage profile of the intake manifold in spite of the supercharger. In addition, it would be practically impossible to individually control the air-fuel ratio or mixtures for each of the engine cylinders. In the latter arrangement, i.e., wherein fuel is directly injected into the combustion chamber, it is quite essential to provide a high fuel injection pressure resulting in a costly fuel feed system.

In consideration of the above described drawbacks in the conventional construction of the fuel feed and combustion systems of a torch ignition type internal combustion engine, it would be advantageous to provide such an improved fuel feed system for an engine including a plurality of cylinders and auxiliary combustion chambers communicating with the main combustion chambers, respectively, and having an ignition plug in each auxiliary combustion chamber, wherein it is possible in practice to independently maintain proper air-fuel mixture ratios at predetermined appropriate values for feeding such mixtures to both the main combustion chambers and the auxiliary combustion chambers. This invention is essentially concerned with such fuel feed system, in which the mixture ratios are controlled as required.

It is therefore a principal object of this invention to provide an improved air-fuel ratio control system of a torch ignition type internal combustion engine.

It is another object to provide an improved air-fuel ratio control system of a torch ignition type internal combustion engine, wherein the air-fuel ratios in auxiliary combustion chambers in main combustion chambers are controlled by the provision of individual main fuel injectors and individual auxiliary fuel injectors in individual and separate branches of an air induction manifold.

In accordance with the invention there is provided a torch ignition internal combustion engine comprising a main combustion chamber communicable with an air induction manifold main branch, an auxiliary combustion chamber provided with a spark plug and communicable with an air induction manifold auxiliary branch and communicating with the main combustion chamber through a flame passageway, a main injector in the main branch, an auxiliary injector in the auxiliary branch, a fuel piping network, an injector pump connected through the fuel piping network to the main injector and the auxiliary injector, control means to control the total volume as well as the timing and splitting of fuel injections through the injectors in coordination or synchronism with the intake stroke of the engine; the arrangement being such that the ratios of the air-fuel mixture formed for combustion in the auxiliary combustion chamber and that formed for combustion in the main combustion chamber are maintained at proper levels and that the flame of a spark ignited mixture in the auxiliary combustion chamber advances through the flame passageway igniting the mixture in the main combustion chamber to produce relatively clean exhaust gas.

The above and further objects, features and advantages of the invention will become more apparent from the following detailed description of the preferred embodiments when read in conjunction with the accompanying drawings in which like parts are designated by like reference numerals.

Figure 1A:
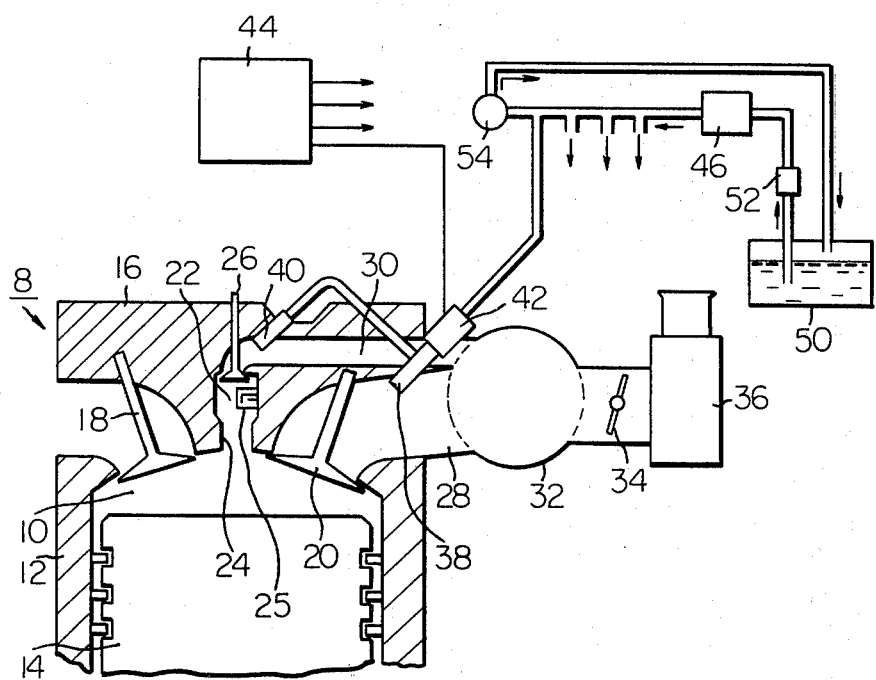
FIG. 1a is a schematic partly sectional view of a first embodiment of an air-fuel ratio control system in accordance with the present invention.

Referring to the drawings and especially to FIG. 1a, a torch ignition type internal combustion engine 8 is shown to have one or more main combustion chambers 10 partly in an engine block 12 and partly in a cylinders head 16, a piston 14 in each combustion chamber 10 and the cylinder head 16 is shown to accommodate for each combustion chamber 10 an exhaust valve 18, a main intake valve 20 and an auxiliary combustion chamber 22 which communicates with the main combustion chamber 10 through a flame passageway 24. A spark plug 25 and an auxiliary intake valve 26 are provided in each auxiliary combustion chamber. An air induction manifold 32 communicates independently and separately through air induction manifold main branches 28 and main intake valves 20 with each main combustion chamber 10 and similarly through air induction manifold auxiliary branches 30 and the auxiliary intake valves 26 with each auxiliary combustion chamber 22. The reference numeral 34 designates a throttle valve and 36 an air cleaner.

A main fuel injector 38 is provided in each main branch 28 and an auxiliary fuel injector 40 in each auxiliary branch 30. With this arrangement fuel is separately injected into air drawn through each main branch and each auxiliary branch to provide separate air-fuel mixtures for each main combustion chamber and each auxiliary combustion chamber. The injectors 38 and 40 may have spray nozzles or simple orifices as will be hereinafter described.

A first embodiment of the fuel feed control system of the invention is illustrated in FIG. 1a. In addition to the above-mentioned elements a fuel piping network (no numeral) is seen to include a fuel injector pump 46, a fuel tank 50, a fuel filter 52 and a fuel pressure regulating valve 54. In this embodiment one injection control valve is provided for controlling both injection timing and the total volume of fuel for injection in part into one main branch and in part into one auxiliary branch.

Figure 1B:
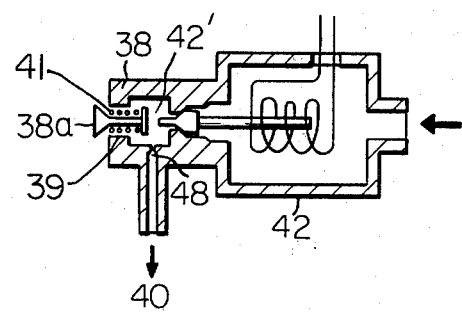
FIG. 1b is an enlarged schematic longitudinal section view of one embodiment of a main fuel injector of the FIG. 1a control system.
Figure 1C:
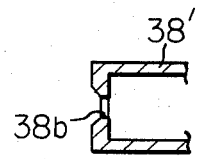
FIG. 1c is an enlarged schematic view similar to FIG. 1b of another embodiment of a main fuel injector.

An example of an injection control valve 42 of the control system of the invention is illustrated in FIG. 1b. As shown, the valve 42 is a solenoid valve the coil of which is connected to an electronic computer 44. The computer 44 produces a control signal in synchronism or coordination with the engine intake stroke opening the solenoid valve to feed a required total amount of fuel (for one power stroke) into a distribution chamber 42', where the fuel is split for injection partly through the main injector 38 and partly through the auxiliary injector 40. In this example splitting ratio is controlled by the available open area of a valve body 38a and the size of an orifice or restrictor 48. The valve body 38a is slidably disposed in an opening 39 formed at an end portion of the main injector 38. A spring 41 is mounted around the valve body 38a for biasing the valve body 38 in a direction to close the opening 39. The fuel pressure opens the valve 38a the available open area of which forms the nozzle of the main injector 38 and meters the amount of fuel for injection into one main branch 28 and the orifice 48 meters the amount of fuel for injection into one auxiliary branch 30. A modification of the main injector 38 is shown in FIG. 1c. A main injector 38' has only a simple orifice or restrictor 38b for metering the amount of fuel for injection into one main branch.

Figure 2A:
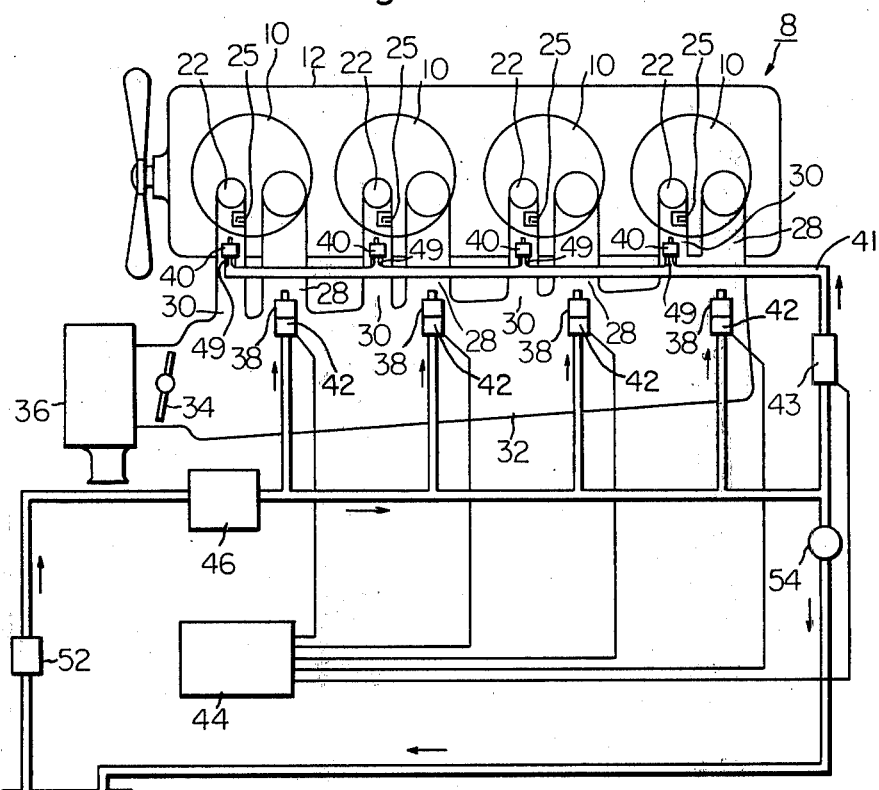
FIG. 2a is a schematic plan view of a second embodiment of an air-fuel ratio control system in accordance with the invention.
Figure 2B:
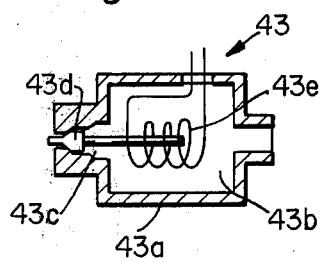
FIG. 2b is an enlarged longitudinal section view of an injector valve of the FIG. 2a system.

FIG. 2a illustrates a second embodiment of the invention wherein the output of each main injector is individually controlled as in the first embodiment, but wherein the outputs of all auxiliary injectors 40 are controlled by only one common injector valve 43 which is electrically connected to the computer 44. As well shown in the FIG. 2a, the common injector valve 43 is disposed in a conduit 41 which provides a communication between the all auxiliary injectors 40 and the fuel pump 46. Furthermore, an orifice or a restrictor 49 is disposed immediately upstream of each injector 40. FIG. 2b illustrates the injector valve 43, which in this embodiment is a solenoid valve. The injector valve 43 comprises a body 43a which has therein a chamber 43b capable of communication with the outside of the chamber 43b through an opening 43c. Slidably disposed in the opening 43c is a valve body 43d which is operatively surrounded by a solenoid coil 43e. The ends of the coils 43e are respectively connected to the computer 44.

Figure 3:
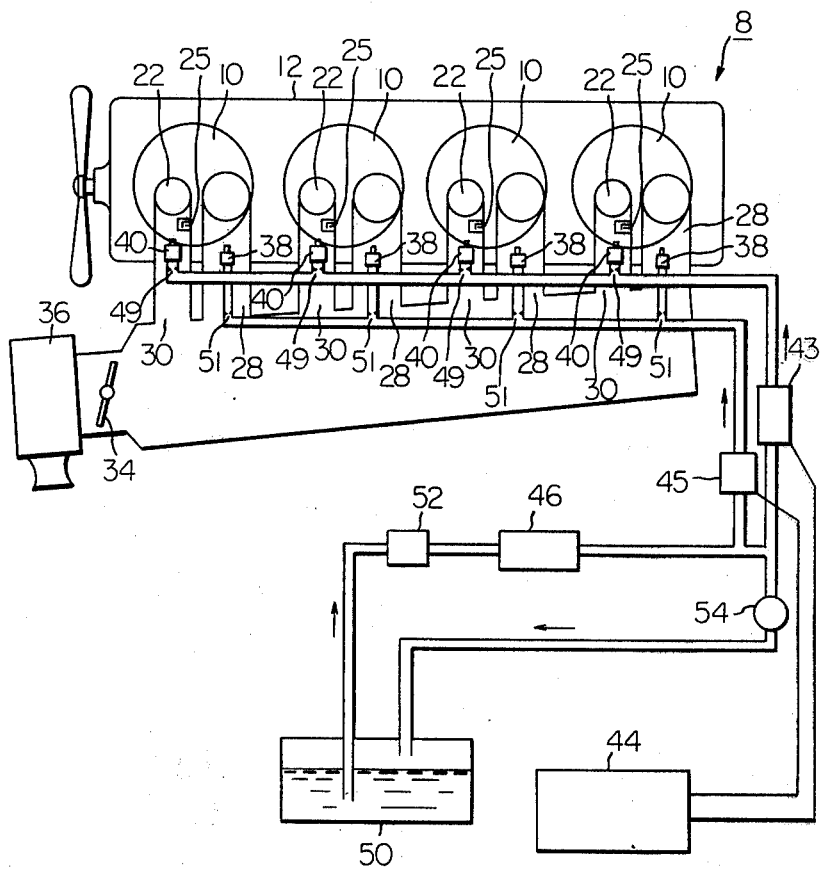
FIG. 3 is a schematic plan view, similar to FIG. 2a, of a third embodiment of the invention.

FIG. 3 shows a third embodiment of the invention wherein not only the outputs of all sub injectors 40 are controlled by only one injector valve 43 as in the FIG. 2a embodiment, but wherein also the outputs of all main injectors 38 are controlled by only one injector valve 45 and an orifice or a restrictor 51 upstream of each injector. The injector valve 45 is also electrically connected to the computer 44.

Figure 4:
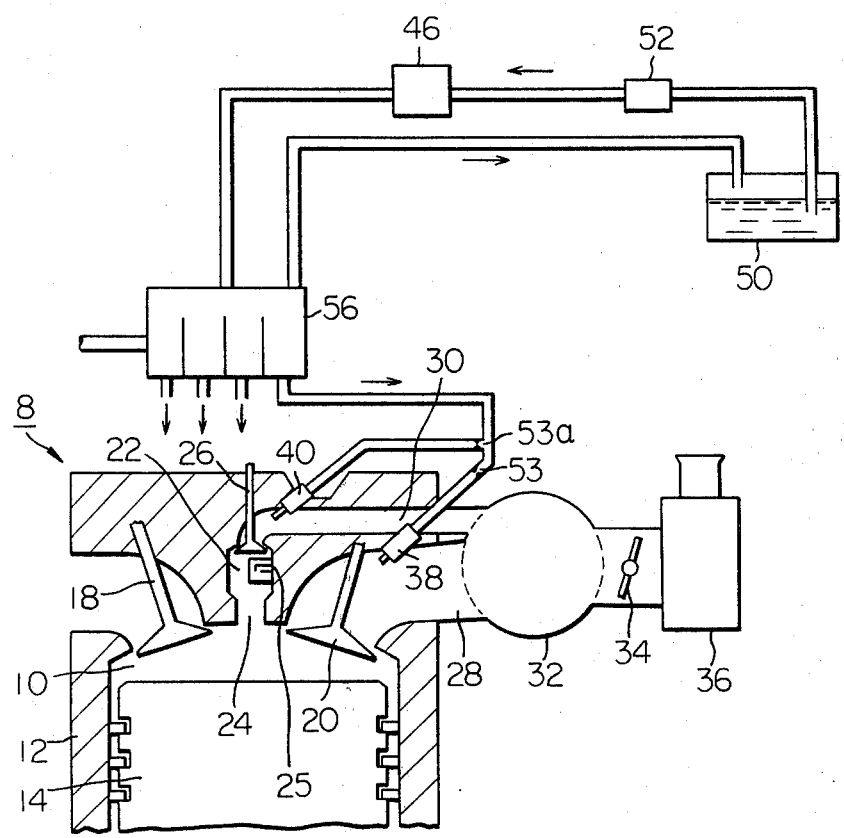
FIG. 4 is a schematic longitudinal section view, similar to FIG. 1a, of a fourth embodiment of the invention.
Figure 5:
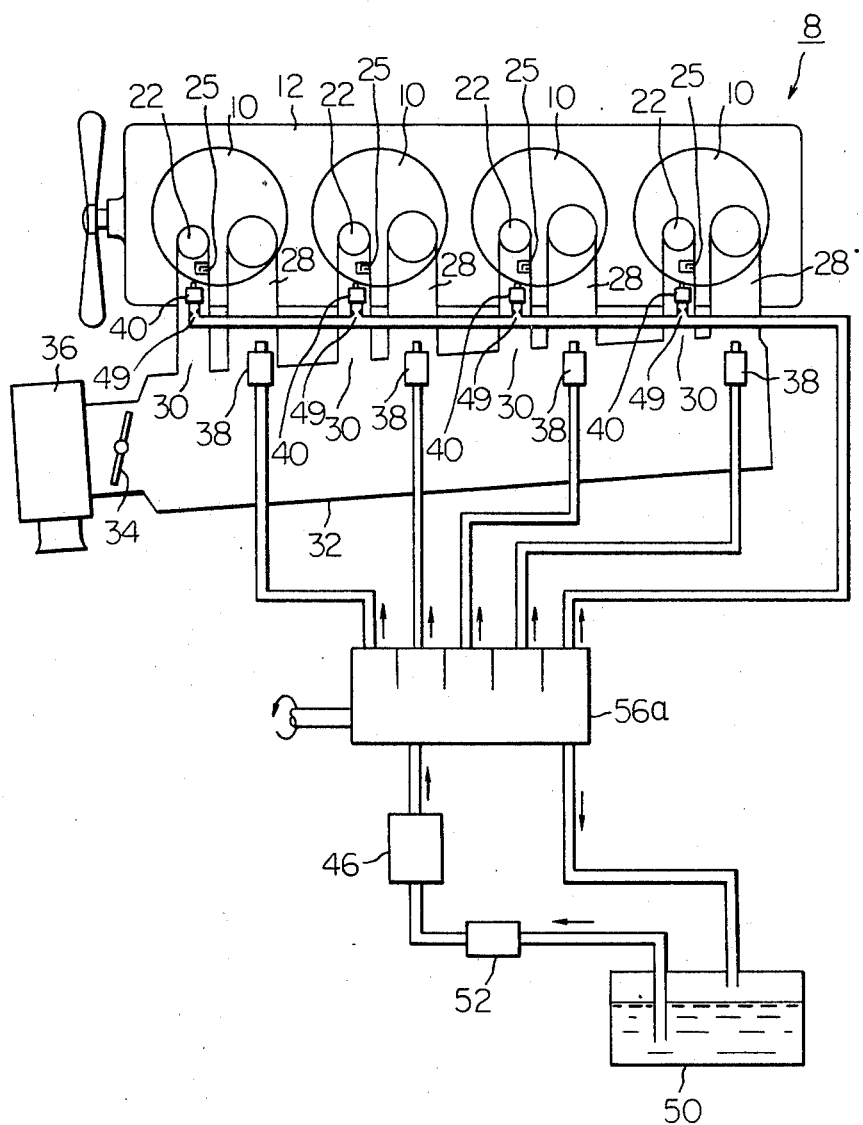
FIG. 5 is a schematic plan view of a fifth embodiment of the invention.

A fourth embodiment of the invention is shown in FIG. 4, wherein the fuel splitting ratio between the injectors 38 and 40 is determined by orifices or restrictors 53 and 53a disposed upstream of the injectors 38 and 40, respectively. In this embodiment a multiple unit fuel pump 56 is installed in the fuel piping downstream of the injector pump 46. Each delivery element of the fuel pump 56 is piped to feed its corresponding engine cylinder through an individual pipe (no numeral) which is branched into two to feed the injectors 38 and 40 through the restrictors 53 and 53a to inject fuel into the induction manifold auxiliary and main branches 30 and 28 respectively. A fifth embodiment is shown in FIG. 5, wherein a multiple unit fuel pump 56a is arranged to control the feed of fuel through individual pipes and the main injectors 38 into the induction manifold main branches 38 as in the fourth embodiment, but only one pipe (no numeral) feeds fuel through the sub injectors 40 into the induction manifold auxiliary branches 30 under the control of the fuel pump 56a.

Figure 6:
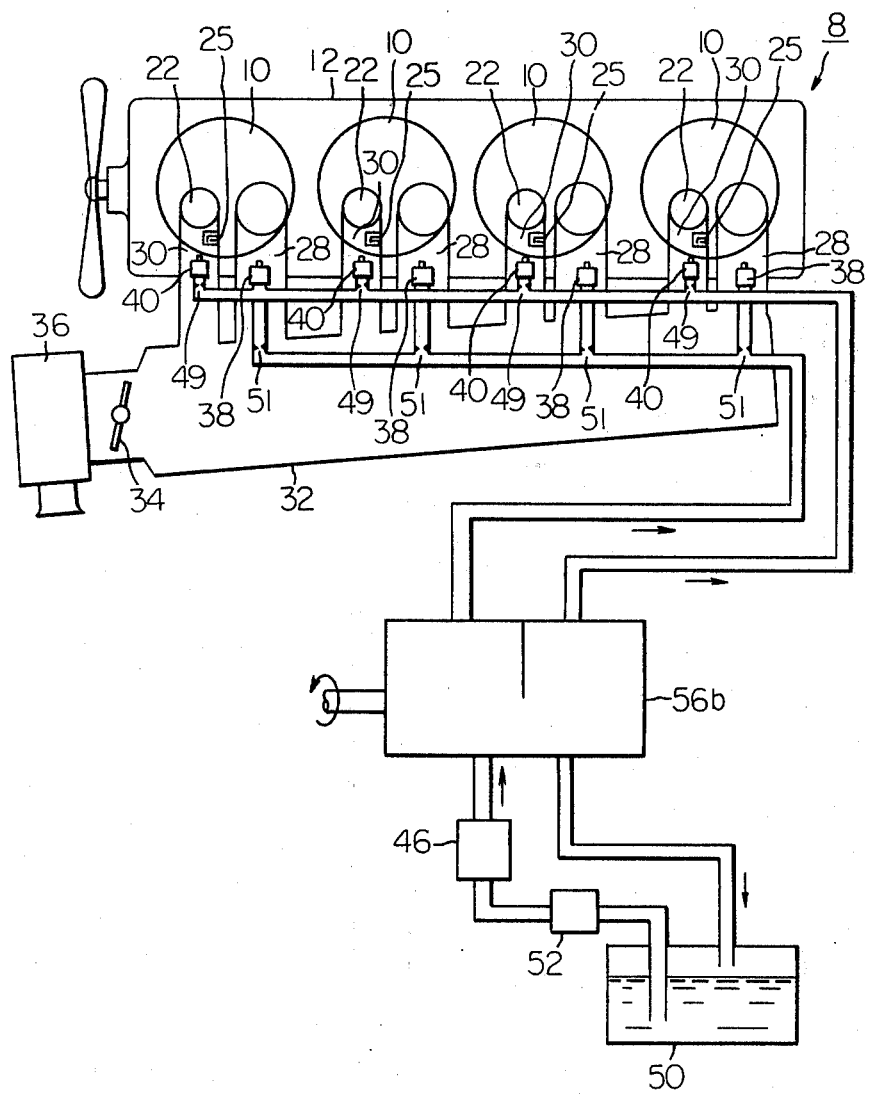
FIG. 6 is a schematic plan view of a sixth embodiment of the invention.

A sixth embodiment of the invention shown in FIG. 6 is similar to the FIG. 3 embodiment except that a multiple unit pump 56b is used to control feed of fuel for injection through the auxiliary and main injectors 40 and 38 instead of the injector valves 43 and 45.

It should be again emphasized here that the computer 44 of the first, second and third embodiments and the multiple unit pumps 56, 56a and 56b of the fourth, fifth and sixth embodiments, respectively, are arranged to operate in coordination or synchronism with engine suction cycles to provide controlled air-fuel ratios of mixtures for both the main and the auxiliary combustion chambers.

What is claimed is:

1. In a fuel supply system for supplying at predetermined values fuel to main combustion chambers as well as to auxiliary combustion chambers of a torch type internal combustion engine, said fuel supply system having a fuel injector pump; the improvement comprising:

a plurality of main fuel injectors respectively mounted in a plurality of main branches which are respectively communicated with said main combustion chambers through main intake valves, each of said main fuel injectors being connected to said fuel injector pump;

a plurality of auxiliary fuel injectors respectively mounted in a plurality of auxiliary branches which are respectively communicated with said auxiliary combustion chambers through auxiliary intake valves, said auxiliary fuel injectors being connected through a common conduit to said fuel injector pump;

a plurality of first injection control solenoid valves respectively mounted on said main fuel injectors and controlling the amount of fuel injected into said main branches;

a second injection control solenoid valve operatively disposed in said common conduit and controlling the amount of fuel injected into said auxiliary branches; and computer means electrically connected with said first and second injection control solenoid valves for operating said first and second injection control solenoid valves in synchronism with the intake stroke of said engine.

2. An improvement as claimed in claim 1, in which each of said main and auxiliary fuel injectors is provided with a fuel flow restrictor.

3. An improvement as claimed in claim 2, in which said fuel flow restrictor is an orifice formed through an end portion of each of said main and auxiliary fuel injectors.

4. An improvement as claimed in claim 2, in which each of said main fuel injectors comprises a first body defining therein a first chamber and formed with a first opening at the end thereof, the fuel being injected from said first opening, a first valve body slidably disposed in the opening of said first body, and a spring arranged around said valve body in said first opening for biasing said first valve body in a direction in which said first body closes said first opening.

5. An improvement as claimed in claim 4, in which said first injection control solenoid valve further comprises a second body defining therein a second chamber and having a second opening at the end thereof, said second opening being open to said first chamber, said second chamber being in communication with said fuel injection pump, a second valve body slidably disposed in said second opening, and a solenoid coil surrounding said second valve body, said coil being electrically connected to said computer means for forcing said second valve body to selectively open and close said second opening in synchronism with the intake stroke of said engine.

6. An improvement as claimed in claim 5, in which said main fuel injector and said first injection control solenoid valve are integrally combined with each other.

7. An improvement as claimed in claim 2, in which said second injection control solenoid valve comprises a body defining therein a chamber having an opening at an end thereof which is in communication, through said common conduit, with said plurality of auxiliary fuel injectors, said second chamber also being in communication with said fuel injector pump, a valve body disposed in said opening, and a solenoid coil surrounding said valve body, said coil being electrically connected to said computer means for forcing said valve body to selectively open and close said opening in synchronism with the intake stroke of said engine.

* * * * *